United States Patent
Rouse

(10) Patent No.: US 6,238,267 B1
(45) Date of Patent: May 29, 2001

(54) GRINDING DEVICES FOR RUBBER COMMINUTING MACHINES

(75) Inventor: Michael W. Rouse, Vicksburg, MS (US)

(73) Assignee: R & D Technology, Inc., Vicksburg, MS (US)

( * ) Notice: Subject to any disclaimer, the term of this patent is extended or adjusted under 35 U.S.C. 154(b) by 0 days.

(21) Appl. No.: 09/314,040

(22) Filed: May 18, 1999

(51) Int. Cl.[7] .................................................... B24B 1/00
(52) U.S. Cl. .................................................. 451/28; 241/37
(58) Field of Search ................................ 451/28, 32, 540, 451/548, 259; 241/37, 259.1, 261.3, DIG. 31

(56) References Cited

U.S. PATENT DOCUMENTS

| | | |
|---|---|---|
| 3,468 | 3/1844 | Arnold . |
| 5,738 | 8/1848 | Kelsey . |
| Re. 5,943 | 6/1874 | Belknap . |
| 29,470 | 8/1860 | Davis . |
| 52,015 | 1/1866 | Belknap . |
| 616,160 | 12/1898 | Sturtevant . |
| 3,326,480 | 6/1967 | Jones .................................. 241/298 |
| 3,552,664 | 1/1971 | Herbert et al. ..................... 241/260 |
| 3,684,200 | 8/1972 | Reinhall ............................. 241/256 |
| 3,974,971 | 8/1976 | Reinhall ........................... 241/261.3 |
| 4,005,827 | 2/1977 | Frair et al. ....................... 241/261.3 |
| 4,036,443 | 7/1977 | Saltarelli ............................ 241/297 |
| 4,351,489 | 9/1982 | Laptev et al. ................... 241/261.3 |
| 4,469,284 | 9/1984 | Brubaker et al. ................ 241/25 TR |
| 4,610,400 | 9/1986 | Sjöbom ............................ 241/261.2 |
| 4,624,420 | 11/1986 | Pilao .................................. 241/298 |
| 4,841,623 | 6/1989 | Rine ................................... 29/525.1 |
| 5,238,194 | 8/1993 | Rouse et al. ......................... 241/21 |
| 5,411,215 | 5/1995 | Rouse ................................. 241/21 |
| 5,449,122 | 9/1995 | Berger et al. .................... 241/261.2 |
| 5,509,610 | 4/1996 | Gibbons et al. ...................... 241/37 |
| 5,526,988 | 6/1996 | Rine ................................... 241/23 |
| 5,564,634 | 10/1996 | Rouse et al. ......................... 241/37 |

Primary Examiner—Derris H. Banks
(74) Attorney, Agent, or Firm—Heller Ehrman White & McAuliffe

(57) ABSTRACT

Grinding stones for rubber comminuting machines are segmented and are applied to backing plates using adhesives. Greater stone life is realized when compared to grinding devices which use mechanical clamps to hold the stones against the plate, and less breakage is encountered using segmented stones than similarly shaped unitary stones known to the art. In the most preferred embodiment, the area between adjacent ends of the stone segments are filled with the same adhesive used to adhere the stones to the backing plates.

17 Claims, 2 Drawing Sheets

GRINDING DEVICES FOR RUBBER COMMINUTING MACHINES

CROSS-REFERENCES TO RELATED APPLICATIONS, IF ANY

None

BACKGROUND OF THE INVENTION

1. Field of the Invention

The present invention relates generally to the field of comminuting machines, such as machines used to grind plastic or elastomer pieces, such as rubber tire pieces, into fine particles. More specifically, the present invention relates to the stones and backing plates used in such grinding machines. In its most preferred embodiment, the stones are segmented and when combined with one another form a toroidal shaped grinding stone of the approximate size and shape already known to the art.

2. Description of the Prior Art

A considerable amount of prior art describes grinding machines which can be used to grind material between abrasive grinding stones. Early machines of this type were used in the food area, but recently they are being used to reduce plastic and rubber waste to particles having very fine mesh sizes, i.e. forty mesh or finer. Such particles are finding many uses as components of various rubber products, such as tires, or as additives in a wide variety of compositions used for roofing, paving, etc.

More recently, the stones and plates on which they are mounted have been improved so that they may be rotated at higher speeds, thus permitting higher production rates and a much broader range of applications. Previously, the operational speed was limited because of the low resistance of the stone to centrifugal and thermal stresses. Thermal stresses are induced when heat is generated by the grinding operation itself. For many applications, such as reducing rubber, plastic or wood material, abrasive grinding stones are preferable to metal discs which are both expensive and suffer additional disadvantages for these particular end use applications. Some additional background on early stone mounting techniques is contained in U.S. Pat. No. 4,841,623 issued to Rine on Jun. 27, 1989 and entitled "METHOD OF MOUNTING STONES IN DISC OR ATTRITION MILLS". The disclosed techniques include the use of molten sulphur, lead or other molding material deposited between a flange of the grinding wheel and the wheel itself, the wheel being slightly enlarged in diameter so that the molten material can hold it in place.

Another technique described in the aforementioned Rine patent uses a layer of specially processed material, usually rubber, to act as a cushion between the stone and its backing plate to relieve grinding strains and shocks. However, where heavy stress and torque loads are encountered, wire or other suitable binding is needed on the outside diameter of the stone.

Grinding wheels have also been found to be of greater benefit than cryogenic hammer-mill techniques which freeze elastomeric particles and crush them while they are in a frozen condition. Wet grinding is a process which has been developed and is described in early patents, such as British Patent No. 1,516,090 to Robinson, et al. and in a series of patents owned originally by The Goodyear Tire & Rubber Company of Akron, Ohio and exemplified by Brubaker, et al. U.S. Pat. No. 4,469,284. The method described therein uses abrasive stones, acting on a rubber particle/water slurry.

Most of the prior comminuting machines utilize vertical grinding machines in which a pair of opposed grinding stones are arranged with their horizontal surfaces facing each other. The top stone is typically fixed in place and the bottom stone is mounted on a motor to rotate it about a vertical axis. Both stones have hollow centers and grind material between the mating faces of the stones which are formed like a flat torus. The material is introduced as a slurry through an opening in the top stone to an open center space formed between the center of the two stones. The slurry passes between the two opposing faces during the grinding process, and the ground slurry is collected in a collection region outside the outer rim of the stones. It is then processed by further steps of screening, drying and the like.

The present inventor has previously made several additional contributions to this art. For example, U.S. Pat. No. 5,238,194 issued Aug. 24, 1993 to Rouse, et al. for "METHOD OF PRODUCING FINE ELASTOMERIC PARTICLES" describes a procedure in which the rate of flow of carrier liquid is established at a desired pressure when the stones are closed, thereby establishing a maximum flow rate of carrier liquid. The slurry is then fed at a flow rate equal to that established for the carrier fluid alone, whereby the gap between the two grinding stones will remain substantially constant and the production rate of ground material will be optimized.

Other techniques, including some of those described in various Brubaker patents, involve the use of hydraulic means to set the spacing between the stones, while other companies have used mechanical devices to set the stone spacing.

Another contribution made by the assignee of the present invention is two-stage grinding, in which finer particles are produced by a two step process. See U.S. Pat. No. 5,411,215 issued May 2, 1995 to Rouse and entitled "TWO STAGE GRINDING". The feed from the feed stock is first transported through stones to produce a −30 to −40 mesh product in a single pass, and water is then added to the resultant product and transported back through a second grinding stage to produce an average of −80 mesh powder.

A still further advance in this art is disclosed in U.S. Pat. No. 5,564,634 issued on Oct. 15, 1996 to Rouse, et al. and entitled "RUBBER COMMINUTING APPARATUS". In this device, instead of using stones mounted for rotation about a vertical axis, rotation around a horizontal axis is employed. Furthermore, the device described in the preferred embodiment of this patent has two vertically mounted grinding stones which do not rotate and which are spaced apart from one another to act as stators. Located between them is a pair of outwardly facing rotor stones. The spacing between the opposed sets of grinding stones is established by increasing or decreasing the spacing between the stators, and while the rotors rotate for grinding, the floating center stones will position themselves equally between the two stators so as to equalize the dynamic slurry pressure imposed during the grinding process upon the faces of the stone.

The particular grinding stones used in such processes have also been described in the aforementioned '634 patent. The stones themselves have various grit sizes established by known techniques, and the mounting of them to the various support plates is also described in this patent. A preferred mounting technique is that described in the aforementioned Rine patent where grinding discs are placed under a compressive load sufficient to counter the tension loads during use. Preferably the compression loading is provided by taper elements incorporating the wheels themselves or by taper elements other than the wheels, such as fluid actuated clamps and elements external to the wheels that induce the compression. Examples of each are shown in FIGS. 1 and 2 of the Rine patent. The Rouse, et al. '634 patent also describes an inherent disadvantage in the Rine system. Namely, because of the clamping structure used to counter the tension loads, the stones may only be used until they are worn down to the upper surface of the clamping members. At this point, the stones must be replaced. It is then necessary to replace the stone. Adhesive mounting of stones, permitting the stone to be ground essentially down to the level of the stator can nearly double the life of the stone. While adhesive binding of the stones to the mounting plates is referred to in this patent, no examples are provided of suitable systems, and, to the knowledge of the present inventor, no suitable commercial systems based upon the use of adhesives alone to bind the stone to the backing plates are in commercial operation.

One reason adhesives have heretofore been disfavored is the tendency of stones to crack or become separated from the backing plates due to the strains and stresses applied during use. The thermal and tensile forces on such stones are particularly large in processes such as the grinding of rubber chips and the like to fine rubber particles. It would represent a substantial improvement in this art to provide grinding stones which could be adhered to backing plates in a manner which would extend the useful life of the stones and avoid the inherent problems in the use of a clamping system which reduce such useful life. It would represent a significant advance in this art to provide a commercially useful adhesive system for attaching stones to backing plates.

FEATURES AND SUMMARY OF THE INVENTION

It is a principle feature of the present invention to provide grinding devices useful in rubber comminuting machines and the like in which the full thickness of the stones may be used in the grinding operation and in which the use of external clamps and the like may be avoided.

Another feature of the present invention is the use of grinding stone segments which may be adhesively attached to a backing plate and which can resist the thermal, tension and other forces imposed upon the stones during the use thereof in such applications as the comminuting of rubber particles into fine mesh material.

A different feature of the present invention is to reduce the cost of grinding stones to companies which employ grinding machines, by reducing the amount of stone breakage and increasing the useful life of the stones.

How these and further features of the invention are accomplished will be described in the following Detailed Description Of The Preferred Embodiment, taken in conjunction with the FIGURES. In general, however, the features of the invention are accomplished by providing segmented grinding stones which, when assembled and adhered on a backing plate, form a grinding stone having the shape of a torus and being similar in size and shape to the stones currently employed in the art. In its most preferred embodiment, the present invention provides two or more segments separately adhered to the backing plate with an adhesive material present between the abutting ends of each individual segment to provide a fully enclosed grinding wheel. In its most preferred embodiment, four or more stone segments are used to further reduce the stresses on the grinding device during grinding operations. The number of segments may be determined for particular operations based on cost, grinding conditions and the like and may approach ten or more segments for each torus shaped stone. It is also envisioned in the present invention that one or both of the stator and rotor pairs of stones may be constructed from such segmented stone without departing from the intended scope of the present invention. For vertical grinding operations such as those described in the aforementioned Rouse, et al. '634 patent, all four stones could be segmented and employ the features of the present invention.

Other ways in which the features of the invention may be accomplished will become readily apparent to those skilled in the art after they have read this specification. Such other ways are deemed to fall with the scope of the present invention if they fall within the scope of the claims which follow.

DETAILED DESCRIPTION OF THE DRAWINGS

In the various FIGURES, like reference numerals are used to denote like components.

DETAILED DESCRIPTION OF THE PREFERRED EMBODIMENT

Figure 1:
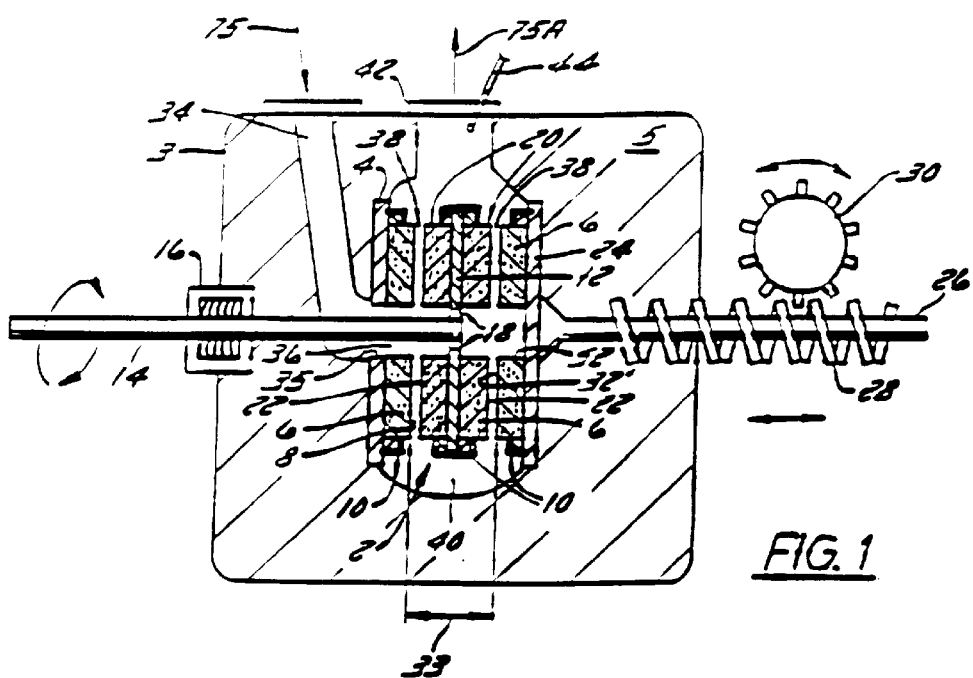
FIG. 1 is a cross-sectional view of a grinding machine utilizing grinding stones according to the prior art.

Before proceeding with the detailed description of the preferred embodiment of the present invention, several general comments can be made about the applicability and the scope thereof.

First, while the grinding stones and backing plates prepared according to the present invention are illustrated for use with the double disc, vertically arranged embodiment used by the assignee of the present invention and described in the aforementioned '634 patent to Rouse, et al., the grinding devices of the present invention may be used in the horizontally arranged rubber comminuting devices described above and for other grinding applications and devices.

Second, while four segments are shown in the preferred embodiment, the number of stone segments may vary widely depending upon operating parameters, the size of the grinding operation and the forces encountered therein. For rubber comminuting devices, the number of segments may preferably range from between two to about twelve, four to six being most preferred. Furthermore, while the drawings illustrate flat, adjoining end surfaces of the stones, the end surfaces may be variously configured. For example, the end surfaces may have a matching tongue and groove or corrugated look to them to increase the surface area of the segment ends.

Third, the composition of the grinding stones themselves may also vary widely and include those abrasive substances already used in the rubber comminuting art and others which are well-known to those skilled in the art. Sintered stones prepared under high hydraulic pressures are currently used with the grit material preferably being carbide in nature. The principles of the present invention are applicable to a wide variety of different grinding materials, including those described in the aforementioned Brubaker, et al. patents originally owned by The Goodyear Tire & Rubber Company.

Fourth, while the present invention relates primarily to the attachment of segmented stones using adhesives, segmented stones may also be attached by other mechanical systems, including those using the ring locking system of the Rine '623 patent and systems employing various other types of fasteners for the stones. The greatest useful life occurs when only an adhesive is used for the attachment of the stone segments to the backing plate, wherein through suitable adjustments of the rotor and stator, accurate grinding may be carried out until the backing plates nearly engage one another.

Fifth, the segmented stones of the present invention are particularly well-suited for use with rubber comminuting devices and in processes described above. However, the grinding stones may also be used in single or multiple pass grinding for a wide variety of particles such as wood, wood chips, elastomers, plastics (such as polyethylene, polypropylene, polybutalyene-perephthalate), and the like.

Sixth, the stones may be employed in grinding operations other than the wet grinding operations described above and which will be described below in connection with the most preferred embodiment (e.g. cryogenic). Such non-wet grinding may be preferred for some food operations and the grinding of biological products, the grinding of agricultural products (e.g., wheat, corn, flour, etc.), the grinding of rigid plastics, and the like.

Figure 2:
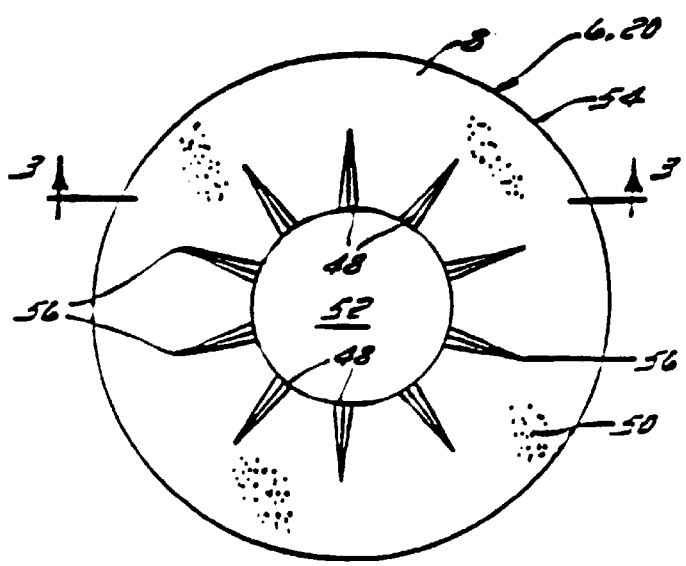
FIG. 2 is a face view of a typical abrasive grinding stone used with the device shown in FIG. 1.
Figure 3:
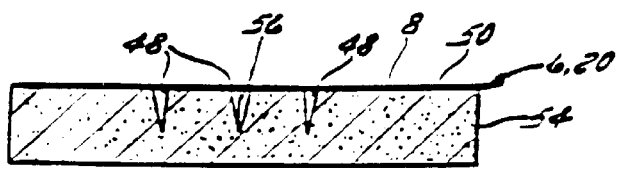
FIG. 3 is a sectional view taken along the line 3—3 of FIG. 2.

Proceeding now to a description of the present invention, a preferred apparatus in which the stones of the present invention may be used will first be described. FIGS. 1–3 illustrate the prior art of the Rouse, et al. '634 patent, assigned to the assignee of the present invention. FIG. 1 shows in cross-section a double disc grinder which comprises a casing 3 and a strong, steel housing having a hinged end section 5 which can be swung away to open the interior of the casing 3 for inspection, removal or maintenance of the interior mechanism described below.

Within the casing 3, against an interior wall thereof, is mounted a first fixed stator 4 comprised of a flat, metal plate fixedly mounted to the casing 3 and having a central bore or opening 35 in the center thereof. Mounted to the stator 4 is a stator abrasive stone 6. Each of the abrasive stones described herein is of the form shown in FIGS. 2–3. These are unitary, composition stones made of sintered or formed abrasive grit material and are shaped like an open-centered flat faced torus. A center bore 52 provides an opening within the center of each stone. Along an inner circumference of the stone are a series of stone grooves 48, each generally triangular in shape and narrowing to a point 56, although the exact shape of the groove is not considered critical. The grooves do not extend for the entire radius of the grinding stone, but rather end at an intermediate point between the center bore 52 and an outer edge 54 of the stones. The remaining outer face 50 of the grinding stone is flat, and forms the surface of the stone where most of the actual grinding will take place.

The grinding operation is carried out according to this prior art teaching by placing an identically formed stone in face-to-face by spaced apart relationship with the abrasive stone, the latter being rotated to create a grinding action. The stator abrasive stone 6 is mounted to the stator 4 by means of a stone mounting clamp 10, a suitable clamp being that described in the aforementioned Rine '623 patent.

Within hinged end section 5 of casing 3 is also mounted a movable stator 24. Moveable stator 24 is mounted to a shaft 26 which moves inward or outward with respect to the hinged end section 5, permitting placement of the moveable stator 24 away or toward stator 4. Any suitable method may be used for moving the movable stator 24. In the illustration, a shaft tooth section 28 is provided upon the moveable stator shaft 26. A stator positioning gear 30, driven by a hand crank or an electric motor, engages with the teeth 28 on stator shaft 26 to move the moveable stator 24 inward or outward with respect to the fixed stator 4.

Moveable stator 26 has in inward face 32. On face 32 a second stator abrasive stone 6 is mounted in the same manner as stator abrasive stone 6 is mounted to fixed stator 4. When so mounted, both the stator abrasive stone 6 mounted to the fixed stator 4 and the stator abrasive stone 6 mounted to the moveable stator 26 are facingly opposed to one another with a space 33 therebetween.

In the space 33 between the stator abrasive stones 6 is mounted a floating rotor 12 which is a steel disc rotor mounted on a floating shaft 14. The latter is supported by a moveable rotor shaft seal 16 within casing 3 for both rotary and lateral movement. Any one of a number of well-known floating drives permits such a rotor to rotate freely and yet freely slide in and out of the casing 3. Such drives are well-known in the art and are not shown here. A suitable drive is sold be Beloit and is identified as "DD 4000", or "The Twin Hydradisk Refiner™" sold by Black Clausen and used commonly in the pulp and paper industry may be employed.

Mounted to the rotor 14 are two rotor stones 20. Rotor stones 20 are of identical construction to stator abrasive stone 6 and are mounted back to back to the rotor 12 so that the rotor stone faces 22 are facing and opposed to the fixed stone grinding face 8 and the moveable stator grinding face 32.

An inlet pipe 34 provides a slurry 75 of rubber particles and water to be ground and is mounted externally to casing 3, passes through casing 3 and provides a channel for the flow of slurry 75 through the stator bore 35. From there the slurry flows into a central open gap 36 formed by the center bores 52 of the grinding stones. Suitable openings or passages 18 are positioned within the center of the rotor 12 to permit a free flow of slurry throughout the central gap 36. The facingly opposed stator and rotor stones 4, 20 are opposed face-to-face. This provides for two parallel grinding passages 38, one between stator grinding face 8 and rotor face 22, another between stator face 32 and rotor face 22.

Depending upon the desired fineness of the grind, an optimum grit size can be selected and for a given grit size, an optimum spacing between the opposing grinding stone faces (i.e. for gap 38) can be determined. Techniques disclosed in the other patents mentioned in the background section of this specification may be used to make such determinations.

The optimum gap is experimentally determined to provide the best production rate for the desired rubber particle size for any given stone grit size. For a given rubber particle size, there is a distinct optimum gap at which the production rate for the desired rubber particle size peaks. The rate of production drops both for larger gaps, where the rubber is not so finely ground, and smaller gaps, where less rubber passes in a given time. A plot of the rubber production rate for the desired sieve size over a range of gap settings will show a single distinct production peak, which occurs at the optimum gap settings. It has also been discovered that as the stone grinding passage 38 is reduced in gap width, there is a steady increase in temperature through the double disc grinder 2. This is due to the increasing friction, and therefore energy is converted to heat as the gap is decreased. At a given grinding machine speed, the outlet temperature becomes a suitable indicator of the size of gap 38.

Around the outer edge of the rotor stones 20 is a ground slurry collection chamber 40. Ground slurry collection chamber 40 connects to a slurry outlet pipe 42 passing the ground slurry 75A to the exterior of the double disc grinder. A temperature sensor 44 is mounted within the slurry outlet pipe 42 to monitory the temperature of the ground slurry 75A after it has passed through the double disc grinder. As indicated previously, additional details concerning the operation and use of the double disc grinder system described in connection with FIGS. 1–3 can be obtained from the aforementioned Rouse, et al. '634 patent.

Proceeding now to a description of the present invention, different grinding devices are employed than those used in the prior art system. Reference can be made simultaneously to FIGS. 4 and 5 to appreciate such differences.

The grinding devices according to the present invention are illustrated as reference numeral 100. The grinding devices 100 include an abrasive grinding stone portion 102 and a backing plate 106. The grinding devices 100 may be used as either or both of the rotor or the stator in the aforementioned double disc grinder system or may be used as a rotor or stator in other horizontal or vertical grinding machines. As with prior equipment, grinding devices 100 have a central opening 110 and may include a plurality of grooves 112, representative ones of which are shown in these FIGURES.

The main feature which-sets grinding devices 100 apart from equipment used previously is that the stone portion 102 is comprised of a plurality of arcuate segments 115, 116, 117 and 118. The number of such segments can vary. The segments should number more than one and preferably be ten or less for grinding devices used in rubber comminuting machines.

A line 113 is shown between each of the aforementioned segments representing the abutment of the first ends (illustrated by the letter A) and the second ends (illustrated by the letter B) of each of the arcuate segments 115–118. Each of arcuate segments 115–118 therefore includes a planar bottom 119, a first end (115A, 116A, 117A and 118A) and a second end (115B, 116B, 117B and 118B) and when placed together, the segments 115–118 forms a general torus shape. The top 120 of each segment is abrasive and forms the grinding surface when combined with another stone in face-to-face but slightly spaced apart relationship.

Figure 5:
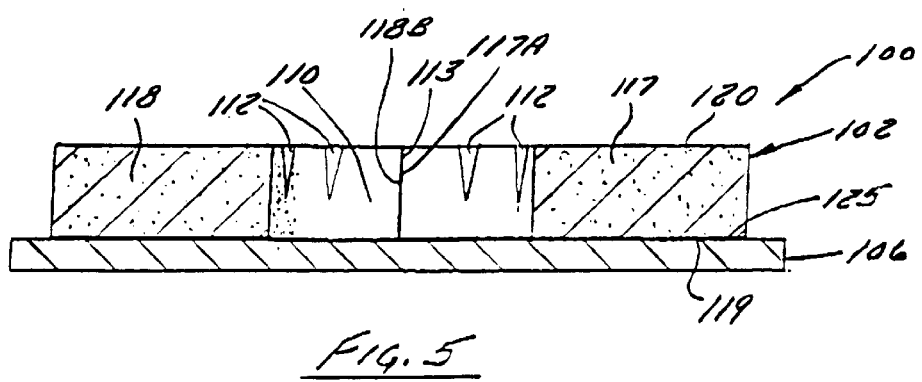
FIG. 5 is a sectional view taken along the line 5—5 of FIG. 4.

A line 125 is also indicated in FIG. 5, representing the adhesive between the planar bottom 119 of a particular segment and the backing plate 106. In most cases, the backing plate will be made from steel and will be cleaned and in some cases abraded (such as by sand or grit blasting) to increase the ability of backing plate 106 to hold an adhesive layer thereupon.

The adhesive 125 may be applied to either a segment 115–118, or to the backing plate 106 or to both. The adhesive may be a single component adhesive which bonds upon drying or a two part adhesive may be employed, one portion of which is applied to the backing plate and another of which is applied to a segment, or vice versa.

The preferred adhesives, according to the present invention, are those selected from the classes of adhesives including epoxies, phenolics, acrylics and other adhesives useful for bonding a ceramic based stone to a metal plate, such as a steel plate.

It is also contemplated that the same or different adhesives may be applied between the adjoining first and second ends of the respective segments 115–118, so that the segments are adhesively bonded to one another as well as being bonded to the backing plate 106. The advantages of the present invention with regard to stress relief under operating conditions can still be realized, with the adhesive acting as a force absorbing layer when used between the abutting ends of particular segments.

By using the grinding devices 100 of the present invention, full use may be made of the abrasive material as the stone portion 102 is consumed. It is, however, also envisioned that a mechanical fastening device may be employed along with the adhesive. For example, the Rine clamps described earlier in the specification may be employed. In such case, the drawback of a relatively short stone lifetime is still present, but the occasional destruction of stones caused by operational forces are lessened through the use of segmented stones when compared to full torus-shaped stones.

Other types of mechanical fasteners could also be used, such as providing bolt heads within the segments themselves and having a threaded portion extend therefrom through the planar bottom 119 of the stones and through holes provided in the backing plate. Bolts could mechanically hold the segmented stones to the plates. These stones could be used down to the top of the bolt head contained within the stone segment. These two examples of mechanical fasteners are for purposes of illustration, rather than limitation.

Figure 4:
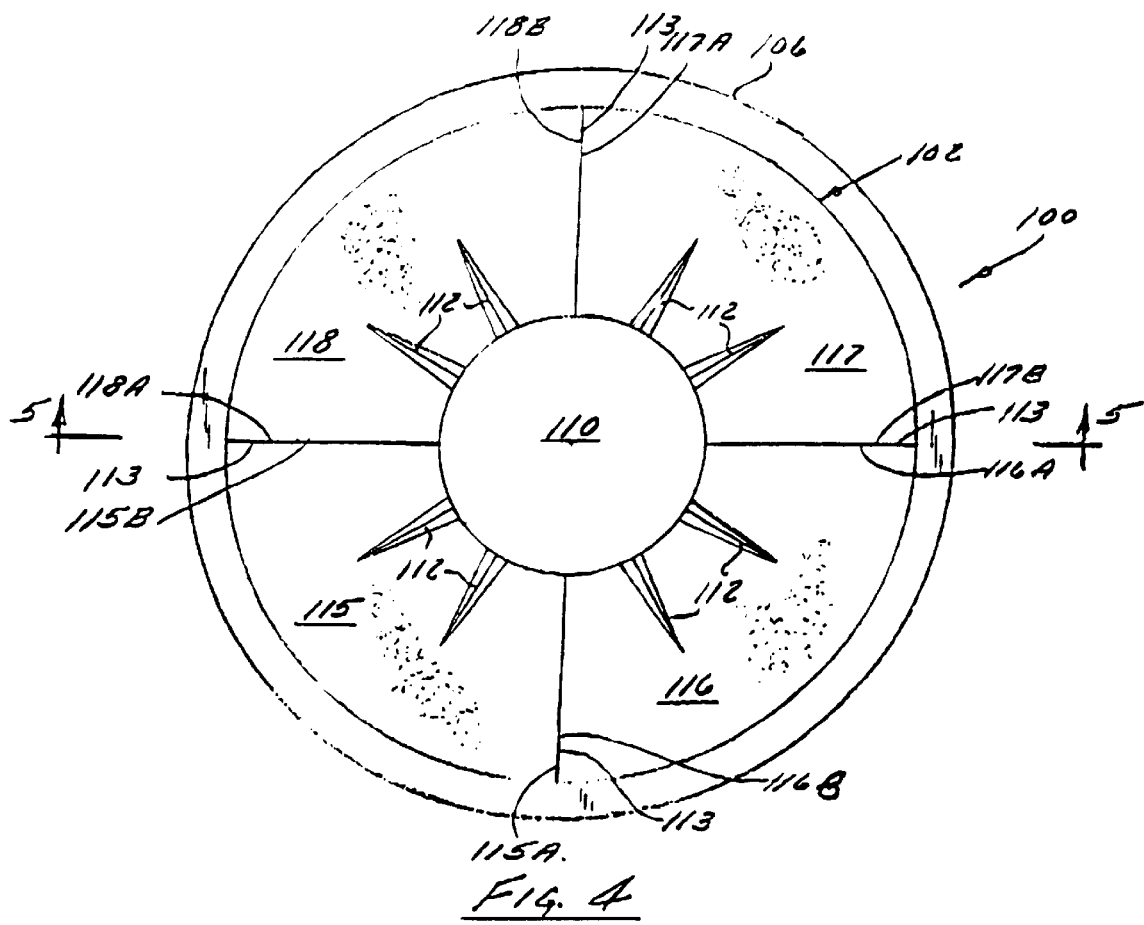
FIG. 4 is a top plan view of a segmented abrasive grinding stone and backing plate according to the preferred embodiment of the present invention.

It should further be indicated that the grooves 112 shown in FIGS. 4–5 can be provided on all segments or only some of them, the choice being well within the range of knowledge of those skilled in the art, once the basic principles of this invention have been understood. It should also be mentioned that if adhesive is not used between the stone segments, the abutting ends will gradually fill with the ground elastomer particles if the grinding devices 100 are used in rubber comminuting machines.

So while the present invention has been described in connection with a particularly preferred embodiment, the invention is not to be limited thereby but is to be limited solely by the scope of the claims which follow.

What is claimed is:

1. A grinding device for use in a solid material comminuting apparatus comprising: a backing plate and a torus shaped stone attached thereto, the stone comprising at least two arcuate segments, each segment having a first end and a second end, a planar bottom and a top abrasive surface, the segments being arranged to form a torus, the planar bottom of each segment being bonded to the backing plate by an adhesive, and wherein the adjacent ends of the segments are bonded to each other by an adhesive.

2. The grinding device of claim 1 wherein the adhesive used to bond the segments to the backing plate is the same adhesive as that used to bond the adjacent segment ends.

3. The grinding device of claim 1 wherein the number of arcuate segments is between from 3 and 10 segments.

4. The grinding device of claim 1 wherein one or more grooves are formed in the abrasive top surface of at least some of the segments.

5. The grinding device of claim 1 wherein the adhesive used to bond the segments to the backing plate is selected from the group consisting of epoxies, phenolics and acrylic adhesives.

6. The grinding device of claim 1 wherein each segment is also held to the backing plate by a mechanical fastener.

7. The comminuting apparatus of claim 1 wherein the number of arcuate segments is between 3 and 10 segments.

8. A comminuting apparatus for reducing the particle size of a feed material presented in the form of a slurry, the apparatus comprising at least one pair of grinding devices in near face-to-face relationship with each other, one of which is fixed and acts as a stator and the other of which is rotatable and acts as a rotor, means for adjusting the space between the rotor and stator of each pair of grinding devices, at least one of the grinders of each pair comprising a backing plate and plurality of acuate segments of grinding stone adhered thereto by an adhesive, each segment having a planar bottom, first and second ends, and an abrasive top surface, the segments forming a tors shape when angled so that the first end of each segment is adjacent to the second end of an adjacent segment, wherein the adjacent ends of the segments are bonded to each other with an adhesive, said stone having a radius and at least one groove, and wherein said at least one groove does not extend the entire radius of said stone.

9. The comminuting apparatus of claim 8 wherein the adhesive used to bond the segments to the backing plate is the same adhesive as that used to bind the adjacent segment ends.

10. The comminuting apparatus of claim 8 wherein one or more grooves are formed in the abrasive top surface of at least some of the segments.

11. The comminuting apparatus of claim 10 wherein the adhesive used to bond the segments to the backing plate is selected from the group consisting of epoxies, phenolics and acrylic adhesives.

12. The comminuting apparatus of claim 8 wherein each segment is also held to the backing plate by a mechanical fastener.

13. The comminuting apparatus of claim 8 wherein two parallel and spaced apart stators are provided along with a gear for adjusting the spacing between the stators and wherein a pair of rotors are arranged back to back to each other but having their grinding surfaces facing one of the stators to provide a double disc grinder comminuting apparatus.

14. The comminuting apparatus of claim 13 wherein each of the rotors and stators includes segmented grinding devices.

15. A method of making a grinding device for a solid material comminuting apparatus comprising the steps of:

selecting a backing plate;

obtaining a torus shaped grinding stone having a radius and having a planar bottom and an abrasive top surface, and having at least one groove which does not extend the entire radius of said stone;

cutting the stone radially in at least two locations to form arcuate segments having first and second ends for each segment;

applying an adhesive to at least one of the backing plate and the planar bottom of each segment, the adhesive being sufficient to bond the segments, wherein the adhesive used in both applying steps is the same adhesive; and placing the bottom of the segments against the backing plate so that the first end of each segment is adjacent the second end of gm adjacent segment to form a generally torus shaped grinding device.

16. The method of claim 15 comprising the further step of applying an adhesive to at least one of the first or second ends of each segment before the placing step so that the segments are bonded to each other and to the backing plate.

17. The method of claim 15 including the further steps of cleaning and abrading the backing plate prior to the applying step.

* * * * *